(12) United States Patent
Polnicki et al.

(10) Patent No.: US 7,695,607 B2
(45) Date of Patent: Apr. 13, 2010

(54) METHOD AND APPARATUS FOR DECONTAMINATION OF FLUID

(75) Inventors: Andrew Polnicki, Maumelle, AR (US); V. Gerald Grafe, Corrales, NM (US); Frank Huang, Socorro, NM (US)

(73) Assignee: ARS USA LLC, Placitas, NM (US)

( * ) Notice: Subject to any disclaimer, the term of this patent is extended or adjusted under 35 U.S.C. 154(b) by 1043 days.

(21) Appl. No.: 11/398,369

(22) Filed: Apr. 5, 2006

(65) Prior Publication Data

US 2006/0237318 A1    Oct. 26, 2006

Related U.S. Application Data

(63) Continuation-in-part of application No. 10/243,561, filed on Sep. 12, 2002, now Pat. No. 6,911,128, and a continuation-in-part of application No. 11/099,824, filed on Apr. 6, 2005.

(60) Provisional application No. 60/368,026, filed on Mar. 27, 2002.

(51) Int. Cl.
 C02F 1/461 (2006.01)
 C02F 1/463 (2006.01)
 C02F 1/465 (2006.01)

(52) U.S. Cl. .............. 205/757; 205/750; 205/751; 205/742; 205/761; 204/269; 204/275; 204/278.5; 204/272; 204/273

(58) Field of Classification Search ............... 205/751, 205/761, 750, 742, 757; 204/269, 275, 278.5, 204/272, 273
 See application file for complete search history.

(56) References Cited

U.S. PATENT DOCUMENTS

| | | | |
|---|---|---|---|
| 3,969,203 A | 7/1976 | Ramirez | |
| 3,969,245 A | 7/1976 | Ramirez | |
| 3,974,070 A | 8/1976 | Popov et al. | |
| 4,071,447 A * | 1/1978 | Ramirez | ........... 210/707 |
| 4,189,381 A | 2/1980 | Laferty et al. | |
| 4,214,920 A | 7/1980 | Amick et al. | |

(Continued)

FOREIGN PATENT DOCUMENTS

| | | |
|---|---|---|
| CN | 1447487 A | 10/2003 |
| WO | WO00/66500 | 11/2000 |

OTHER PUBLICATIONS http://www.electropure.com.au/; printed Sep. 23, 2005.
http://www.dequachim.be/html/electrochemical.html; printed Sep. 23, 2005.

*Primary Examiner*—Bruce F Bell
(74) *Attorney, Agent, or Firm*—V. Gerald Grafe

(57) ABSTRACT

The invention relates to methods and devices for the decontamination of fluid, particularly the removal of heavy metals and/or arsenic and/or their compounds from water, by means of electrolysis, wherein the water to be purified subjected to electrodes of different polarities. The invention can include means for control of the pH of the fluid. The invention can also include control systems that allow self-cleaning of electrodes, self-cleaning of filters, and automatic monitoring of maintenance conditions.

25 Claims, 7 Drawing Sheets

U.S. PATENT DOCUMENTS

| | | | |
|---|---|---|---|
| 4,293,400 A | 10/1981 | Liggett | |
| 4,295,946 A | 10/1981 | Nazarian et al. | |
| 4,321,125 A | 3/1982 | Nazarian et al. | |
| 4,378,276 A | 3/1983 | Liggett et al. | |
| 4,490,230 A | 12/1984 | Fletcher | |
| 4,623,436 A * | 11/1986 | Umehara | 205/743 |
| 4,786,384 A | 11/1988 | Gerhardt et al. | |
| 4,872,959 A | 10/1989 | Herbst et al. | |
| 5,108,563 A | 4/1992 | Cook | |
| 5,372,690 A | 12/1994 | Gardner-Clayson et al. | |
| 5,385,653 A | 1/1995 | Tamarkin | |
| 5,531,865 A * | 7/1996 | Cole | 205/751 |
| 5,558,755 A | 9/1996 | Gardner-Clayson et al. | |
| 5,611,907 A | 3/1997 | Herbst et al. | |
| 5,616,241 A | 4/1997 | Khudenko | |
| 5,658,450 A | 8/1997 | Tamarkin | |
| 5,833,940 A | 11/1998 | Reiber et al. | |
| 5,879,546 A | 3/1999 | Burford | |
| 5,928,493 A | 7/1999 | Morkovsky et al. | |
| 6,139,710 A | 10/2000 | Powell | |
| 6,183,597 B1 | 2/2001 | Siegle | |
| 6,238,546 B1 | 5/2001 | Knieper et al. | |
| 6,241,861 B1 | 6/2001 | Herbst | |
| 6,267,871 B1 | 7/2001 | Weakly et al. | |
| 6,270,650 B1 | 8/2001 | Kazi et al. | |
| 6,294,061 B1 | 9/2001 | Morkovsky et al. | |
| 6,325,916 B1 | 12/2001 | Lambert et al. | |
| 6,346,197 B1 | 2/2002 | Stephenson et al. | |
| 6,358,398 B1 | 3/2002 | Halldorson et al. | |
| 6,406,678 B1 | 6/2002 | Shipley | |
| 6,488,835 B1 | 12/2002 | Powell | |
| 6,582,592 B2 | 6/2003 | Arnaud | |
| 6,613,217 B1 | 9/2003 | Gilmore | |
| 6,663,783 B2 | 12/2003 | Stephenson et al. | |
| 6,689,271 B2 | 2/2004 | Morkovsky et al. | |
| 6,719,894 B2 | 4/2004 | Gavrel et al. | |
| 6,797,179 B2 | 9/2004 | Arnaud | |
| 6,866,757 B2 | 3/2005 | Gilmore | |
| 6,887,368 B2 | 5/2005 | Khalemsky et al. | |
| 6,902,678 B2 | 6/2005 | Tipton | |
| 6,972,077 B2 | 12/2005 | Tipton et al. | |
| 7,087,176 B2 | 8/2006 | Gavrel et al. | |
| 7,211,185 B2 | 5/2007 | Powell | |
| 2002/0020631 A1 | 2/2002 | Gavrel et al. | |
| 2002/0040855 A1 | 4/2002 | Morkovsky et al. | |
| 2002/0088710 A1 | 7/2002 | Powell | |
| 2002/0185446 A1 | 12/2002 | Arnaud | |
| 2003/0136686 A1 | 7/2003 | Herbst | |
| 2003/0136740 A1 * | 7/2003 | Watanabe et al. | 210/695 |
| 2003/0196938 A1 | 10/2003 | Arnaud | |
| 2004/0079650 A1 | 4/2004 | Morkovsky et al. | |
| 2004/0238365 A1 | 12/2004 | Tipton et al. | |
| 2004/0251213 A1 | 12/2004 | Bradley | |
| 2005/0218081 A1 | 10/2005 | Dmitriev et al. | |
| 2005/0224338 A1 | 10/2005 | Kin et al. | |
| 2005/0230321 A1 | 10/2005 | Berrak | |
| 2005/0247571 A1 | 11/2005 | Grigg | |
| 2005/0274606 A1 | 12/2005 | Powell | |
| 2006/0096853 A1 | 5/2006 | King | |

* cited by examiner

METHOD AND APPARATUS FOR DECONTAMINATION OF FLUID

CROSSREFERENCE TO RELATED APPLICATIONS

This application claims the benefit of U.S. provisional application 60/368,026, filed Mar. 27, 2002, and is a continuation-in-part of U.S. utility application Ser. No. 10/243,561, now U.S. Pat. No. 6,911,128, "Device for Decontamination of Water," filed Sep. 12, 2002, and is a continuation-in-part of U.S. utility application Ser. No. 11/099,824, "Method and Apparatus for Decontamination of Fluid," filed Apr. 6, 2005, each of which is incorporated herein by reference.

BACKGROUND

The present invention relates to a device for the decontamination of water, particularly of arsenic, heavy metals, hydrocarbons, tensides, phosphates, dies, suspended substances, toxic substances, other electrochemically cleavable substances and their compounds, by means of an electrolytic device. In addition this device can reduce CSB-values and can strip out chlorine and aromatics; even stubborn bacteria cultures such as vibrio cholera and enterococcus faecium can be extinguished and filtered out later. The present invention can provide for the treatment of contaminated water sources such as above ground and underground source drinking water purification, and for industrial and residential wastewater decontamination for discharge of the treated.

There is growing environmental and social pressure being applied to the nation's waterways. The growing demand on existing water sources is forcing the evaluation of previously unusable water sources for domestic needs. In addition, increasing pressure is being applied to all forms of treated effluent in the nation's waterways. Various contaminants such as heavy metals, arsenic, naturally occurring and industrial carcinogens, etc., are subject to increasingly strict regulatory requirements. Federal, state, and local governments are imposing maximum contamination levels for drinking water distribution and wastewater discharge into public and private waterways.

A need exists for economical and efficient methods and apparatuses for treating various wastewater and drinking water sources, which can reduce the amount of regulated contaminates below regulated and suggested maximum limits. Current methods and apparatuses generally address only single contaminants, and require constant monitoring, chemical addition, or multiple passes through a device to separate contaminants from the water. Methods and apparatuses with the capacity and flexibility to support throughputs ranging from 20 gallons an hour to 100,000 gallons an hour are desirable.

SUMMARY OF THE INVENTION

The invention relates to methods and devices for the decontamination of fluid, particularly the removal of heavy metals and/or arsenic and/or their compounds from water, by means of electrolysis, wherein the water to be purified subjected to electrodes of different polarities. The invention can include means for control of the pH of the fluid. The invention can also reduce the "hardness" of water by reducing the concentration of constituents such as calcium, magnesium, or alkalinity in water. The invention can also include control systems that allow self-cleaning of electrodes, self-cleaning of filters, and automatic monitoring of maintenance conditions.

A method according to the present invention can comprise providing a reactor, having electrodes mounted therein and suitable for containing contaminant-laden fluid. The electrodes can be energized by applying an electrical potential across them, contributing to an electrolytic reaction with the contaminants. The electrolytic reaction produces a combination of electrode material and contaminant, resulting in flock which can be removed by filtering.

The electrical potential required to stimulate a certain current can depend on the spacing between electrodes. As electrodes are consumed by the reaction, the inter-electrode spacing increases, as does the required electrical potential. This potential can be monitored to provide an indication of the state of the electrodes. For example, a required potential over a threshold (or, equivalently, a resulting current below a threshold) can indicate that electrodes should be replaced.

Contaminants in the fluid can also adhere to the non-consumed electrodes, reducing the performance of the reactor. The electric potential can be reversed in polarity periodically. By reversing the polarity, the electrodes that had been subject to contamination are converted to electrodes that are consumed in the reaction. Consumption of electrode material can remove contamination from the electrode surface, allowing the reactor to be to some extent self-cleaning.

DESCRIPTION OF THE FIGURES

The invention is explained by using embodiment examples and corresponding drawings, which are incorporated into and form part of the specification.

DETAILED DESCRIPTION

Method of Decontaminating Fluid

The present invention provides methods and devices that facilitate the removal from water or other low-conductivity fluid of arsenic, heavy metals, hydrocarbons, tensides, phosphates, dies, suspended substances, toxic substances, electrochemically cleavable substances, and their compounds. The present invention can also reduce CSB-values and strip out chlorine and aromatics; even stubborn bacteria cultures such as vibrio cholera and enterococcus faecium can be extinguished and filtered out later. The present invention can also neutralize scents. Unlike previous approaches, the present invention does not require the use of membranes, chemicals, micro filtration, or specialty materials or alloys for anodes and cathode construction. The present invention can be realized with simple construction methods, and is flexible enough support a variety of design options.

Figure 1:
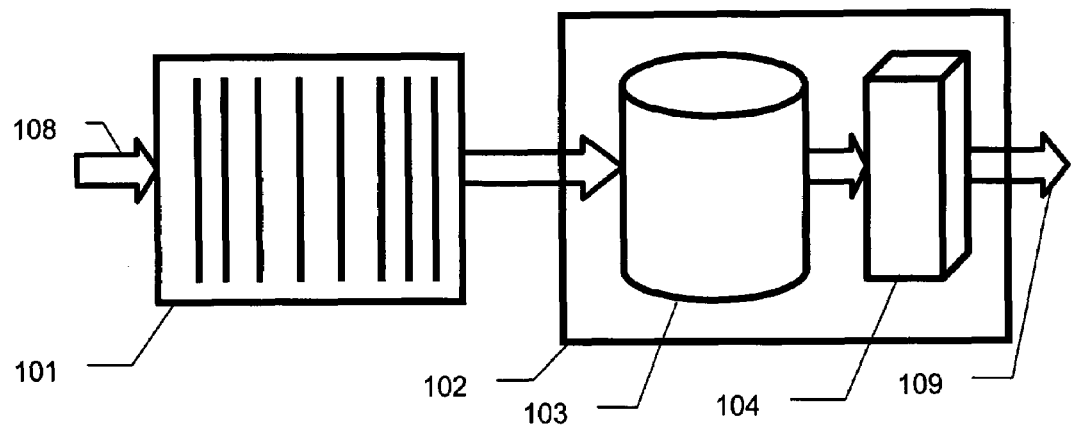
FIG. 1 is a schematic illustration of an apparatus according to the present invention.

The present invention can be used in both open system, partially open system, and closed system methods. An open system method is one where fluid to be treated is exposed to the atmosphere, and is not under pressure. A closed system method is one where fluid to be treated is not exposed to the atmosphere, and is generally under pressure. A partially open system has part of the system at atmospheric pressure; e.g., a reaction vessel can be open to the atmosphere, while the rest of the system closed and pressurized. Any of the methods can be practiced with an apparatus such as that shown schematically in FIG. 1. Contaminated fluid enters a reactor 101 at an inlet 108 thereto. The reactor 101 comprises one or more anodes and one or more cathodes, and an electrical system adapted to supply electrical current through the fluid via the anodes and cathodes. The electrolytic reaction in the reactor 101 binds the contaminant into a flock material, which is passed with the remaining fluid to a flock removal subsystem 102. A flock removal subsystem 102 can comprise a holding vessel 103 and a filter 104. After the flock is removed, the remaining fluid, cleaned of the contaminant, exits the apparatus via an outlet 109. The invention can also comprise control of the pH of the reaction, described below.

An open system method of decontaminating fluid according to the present invention comprises fluid processing through a reactor. The fluid is passed between a reactor anode and a reactor cathode subject to electrical potential and for an amount of time effective to separate the contaminants from the fluid. The reaction can increase the pH of the fluid. The contaminants and fluid form into a flock material and small amounts of O2 and H2. The fluid and the flock can then be passed to a holding vessel. The holding vessel can comprise a hollow container which adds residence time to the flock building process. An amount of time suitable for the flock building process can elapse, and then the fluid and the contaminants can be passed to a filter. As the fluid and flock flow through the filter, the filter material can trap the flock and the purified fluid passes through the filter. In an open system, pumps can be used to transfer fluid from the reactor to the holding vessel, and from the holding vessel to the filter.

A closed system method of decontaminating water according to the present invention comprises fluid processing through a reactor such as those described herein. The water is passed between a reactor anode and a reactor cathode subject to electrical potential and for an amount of time effective to separate the contaminants from the fluid. The contaminants and fluid form into a flock material and small amounts of O2 and H2. The closed reaction vessel can have means of venting gasses built up within the closed system. The fluid and the flock can be passed to a closed holding vessel. The holding vessel can comprise an empty container which adds residence time to the flock building process. An amount of time suitable for the flock building process can elapse, and then the fluid and the contaminants can be passed to a filter. As the fluid and flock flow through the filter, the filter material traps the flock and the purified fluid passes through the filter. In a closed system, generally the fluid enters under pressure, and that pressure causes the fluid to flow through the reactor, the holding vessel, and the filter.

Figure 2A:
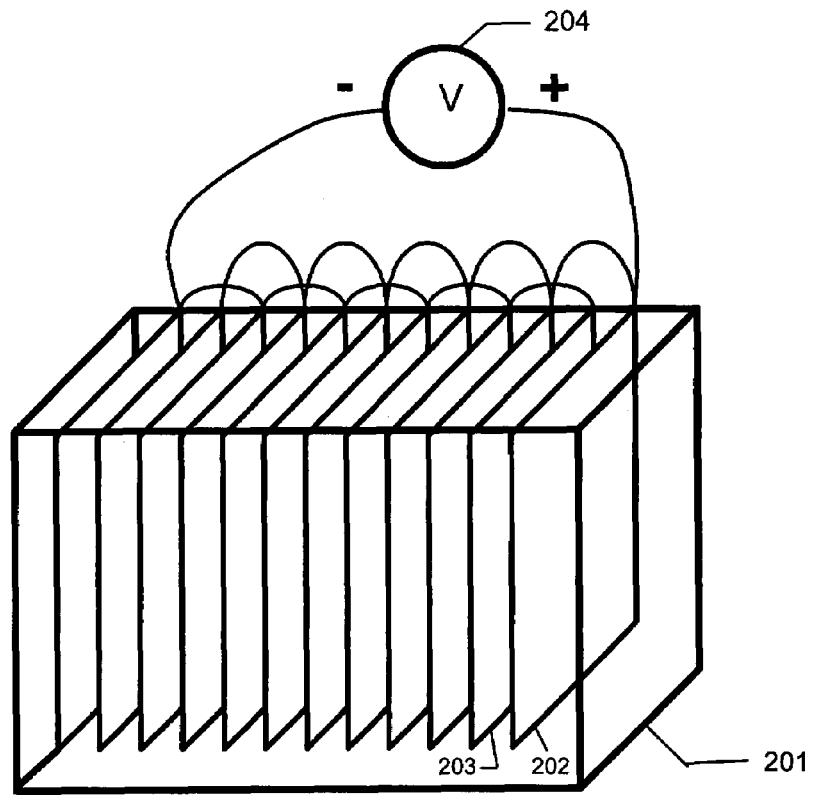
FIG. 2(a,b,c) are schematic illustrations of various anode/cathode configurations in accordance with the present invention.
Figure 2B:
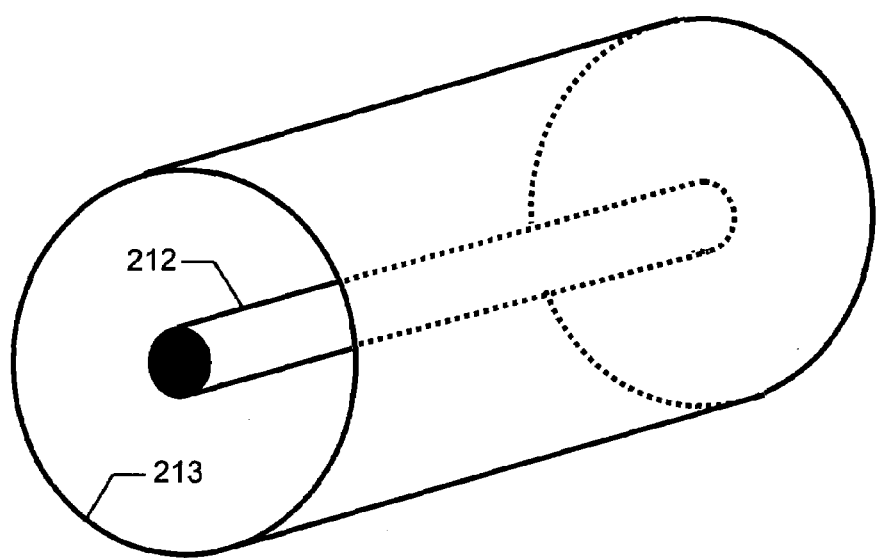
Figure 2C:
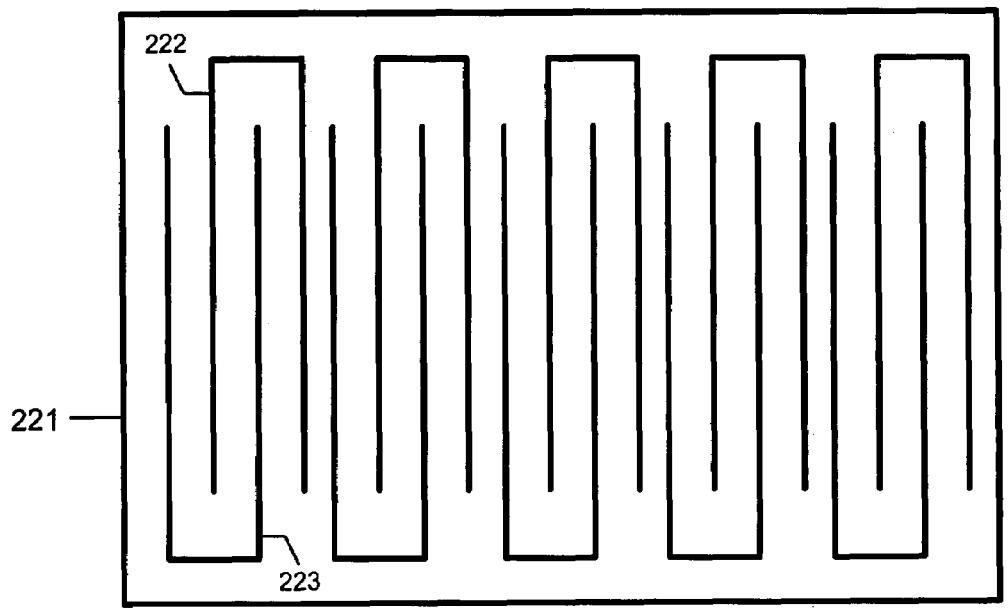

Reactors suitable for the present invention can comprise various configurations. Contaminated fluid passes between anodes and cathodes. The material comprising the anodes and cathodes, the separation between the anodes and cathodes, and the electrical energization of the anodes and cathodes can affect the performance of the reactor. FIG. 2(a,b,c) are schematic illustrations of various anode/cathode configurations. The configurations in the figures are for illustration only; those skilled in the art will appreciate other configurations that are suitable. In FIG. 2a, substantially flat plates comprise the anodes 202 and cathodes 203. The anodes 202 and cathodes 203 mount within a tank to form a reactor 201. An electrical system 204 energizes the anodes 202 and cathodes 203. In FIG. 2b, an anode 212 mounts within a cathode 213, shown in the figure as coaxial although that is not required, to form a reactor 211. In FIG. 2c, anodes 222 and cathode 223 are U-shaped, and mounted with a tank to form a reactor 221.

Aluminum anodes and cathodes can be used to remove contaminates from drinking and waste water. The aluminum electrodes can be at least 95% pure. In some applications the reaction will result in a 0.5 increase in pH values. The aluminum anodes can be consumed during the purification process. pH values are between 6.5-7.5 can foster efficient reaction. As the pH increases above 8.5, significant reduction in efficiency can occur and undesirable anode consumption can occur.

Iron anodes and cathodes can be used to remove contaminates from industrial and waste water. The iron can be at least 95% pure. In some applications the reaction will result in 0.5 increase in pH values. The iron anodes can be consumed during the purification process. The reaction can be less sensitive to pH values than that with aluminum anodes and cathodes. The working pH values can be between 4.5-9.5.

Carbon graphite anodes and cathodes can be used in the reactor, and can reduce liquid pH values. Also, carbon electrodes, especially when used as cathodes, can be less susceptible to electroplating or pacification which can reduce performance. These anodes and cathodes can be made from at least 99% pure carbon, converted to graphite through typical industry practices. If the starting PH value is below 7.0, graphite plates might not be needed for pH management. When the purification process occurs with iron or aluminum anodes and cathodes, there can be a 0.5 to 1.0 increase in pH. If the liquid is highly contaminated, the reaction power requirements can be high and the reaction time long; these can increase the pH. If the starting pH is above 8.0 it is common to either have a high percentage of graphite plates (over 25% of the total) or to have a two step process. The first step can be to have a graphite reaction only to reduce the pH to preferred working values (e.g., 6.0-8.0). This will reduce the pH value and permit the normal decontamination reaction to occur. In many applications a 20% graphite anode and cathode quantity will be adequate to maintain a constant pH value of the liquid. It is also possible to increase the pH reduction capacity by increasing the current applied to the graphite anodes and cathodes.

The desired proportions of anode and cathode materials can be determined experimentally. The input and output requirements can first be identified. Iron is more typical for industrial waste water applications. Aluminum is more typical for drinking water applications. In some cases it can be possible to use both aluminum and iron together. Next the incoming pH can be determined. If the value is 5.5 to 6.5, graphite anodes and cathodes might not be required. If the pH is between 6.5 to 7.5, about 20% graphite plates can be suitable. If the pH is above this it can be necessary to experimentally determine the amount of graphite required to reduce the pH to normal. In very high pH situation (e.g., greater than 8.5), a two step process can be necessary: a first step for pH reduction, and a second reduction for contaminant removal and, optionally, further pH control. The aluminum and iron anode and cathode ratios can be determined by the intended application and expected contaminants, and can be readily optimized experimentally.

Anodes and cathodes can have various shapes and surfaces, depending on the reactor design and performance desired. In some embodiments, anodes and cathodes can comprise solid, substantially impermeable, smooth plates. In other embodiments, anodes and cathodes can have other shapes (e.g., tubes or rods in an annular reactor). The anode and cathode surfaces in some embodiments can be non-smooth (e.g., corrugated, pleated, rough).

Anodes and cathodes can be spaced apart a distance according to the conductivity of the fluid. The fluid conductivity contributes to an electrical load on the power supply. In general, greater anode-cathode separation corresponds to greater power supply voltage required. In many applications, a 15 mm separation between anode and cathode is suitable. In some applications, a power supply required voltage of 10 VDC or more indicates that the anode-cathode separation is too large. In some applications, a power supply required voltage of 8 VDC or less indicates that the anode-cathode separation is too small. Anodes and cathodes can be paired in alternating sequence, although other arrangements, including unequal numbers of anodes and cathodes, can also be suitable.

The thicknesses of the anodes and cathodes can be in accordance with the overall structure of the reactor. In a reactor with parallel plate anodes and cathodes, the thickness can be established for convenience of manufacture and assembly. Since the flock production reaction consumes material from the anodes, anode thickness can affect the time between anode replacements. Since the flock production reaction does not consume material from the cathodes, cathode thickness is generally not critical to reactor lifetime.

The polarity of the electrical power supply can also be reversed from time to time. Reversing the polarity effectively exchanges the roles of the anodes and cathodes: anodes at one polarity become cathodes at the opposite polarity. Reversing the polarity can distribute the material consumption across all the electrodes, consuming from one set at one polarity, and from another set at the opposite polarity. This can lengthen the time between electrode replacements.

Reversing the polarity can also provide an automatic self cleaning of the reactor electrodes. When the cathode is changed into an anode, it begins the anode consumption process and can strip away any potential buildup of contaminants on the cathode. This polarity reversing cycle can occur every six hours in some applications. This will balance the reactor anode consumption upon both sets of electrodes. In highly contaminated environments this cycle time can be decreased. The buildup of contaminants on the cathode can be detected by monitoring the voltage demand on the power supply. A rapid increase in voltage required can indicate either increased anode-cathode separation or contaminant buildup on the cathode. Accordingly, an increase in voltage required can indicate that a polarity reversal is in order; if reversing the polarity does not decrease the voltage required, then the electrodes might need replacing (for example, if too much material has been consumed from their surfaces to maintain the desired separation).

The anodes and cathodes can be of any size, although it can be desirable to configure the reactor so that the anode and cathode surface area are as large as possible to increase the contaminant removal performance of the system. The total anode surface area can be approximately equal to the total cathode surface area, for example in a tank with parallel plate electrodes. The total surface areas can also be different, as might be the case in an annular reactor. Keeping some part of the electrodes out of the fluid can be desirable in some applications to prevent fluid damage of the electrical connections to the electrodes.

The present invention can be operated in both batch and continuous modes. In a batch mode, a reactor is filled with contaminated fluid and operated until a desired end state (e.g., a desired level of contaminant remaining). Batch operation allows precise control of operating parameters such as voltage and current to the electrodes. In a continuous mode, contaminated fluid is continuously communicated to a reactor, and decontaminated fluid is continuously removed from the reactor. A potential drawback to a continuous mode is that there can be blending of contaminated fluid with decontaminated fluid, lowering the effective performance of the reactor. Some reactor configurations can control the amount of blending to maintain consistent contaminant removal.

The holding tank size can be determined through experimental means. It can be designed to hold at least three minutes of reacted fluid to permit additional flock growth. In some instances it can be useful to provide additional flock growth time. Flock-laden fluid, such as fluid in a holding tank or in pipes, can be treated using any of a variety of techniques to encourage separation of flock and contaminants from the clean fluid. As an example, ultrasonic energy imposed on the fluid can encourage separation of the flock from the fluid, in some applications by differentially attracting flock. Flock having an electric charge can be separated electrostatically by means of an electric field. Charged flock particles moving (e.g., in a pipe) can be separated magnetically. Other flock particle drivers such as visible and infrared light, gravity, and pressure differentials, can also be used. The techniques described can be used alone or in combination with these or other techniques.

As an alternative to a holding tank, or in combination with a holding tank, a separator can be used to separate flock from treated fluid. Note that the separator can generate just a flock-enriched fluid portion and a flock-depleted fluid portion. A holding tank, filter, or combination thereof can be used to completely remove flock from the fluid. Separated flock, or flock-enriched fluid, can be routed to a reactor (the same as where it was initially generated, or another reactor), or to a holding tank or reservoir to promote mixing with fluid to be treated. It has been found that, in many applications, only a small portion of the flock generated binds contaminants. However, a large concentration of flock is desired to ensure that contaminants do bind with flock. Consequently, recycling flock with a separator can yield the desired high flock concentrations without requiring continuous high flock generation by the electrodes. System power requirements and electrode consumption can be reduced by such flock recycling. In operation, the flock generation in the reactor can be controlled (e.g., by controlling electrode voltage or current, electrode spacing, number of electrodes energized, type of electrodes energized, etc.) to produce the desired flock concentration. In a start-up phase, the electrodes can be controlled to generate a large amount of flock. As the flock flows through the reactor and is recycled, the control system can reduce the flock generation by the electrodes, maintaining the desired flock concentration (or other monitored characteristic) with reduced power and electrode consumption. Accordingly, a method of the present invention can remove at least some of the flock from the fluid and return at least some of the flock to fluid in an electrical current flow path between the anode and the cathode electrodes of the reactor. Further, an apparatus of the present invention can comprise a flock recycling and removal system comprising a flock separator, configured to separate fluid from the reactor into two portions: a flock-enriched portion and a flock-depleted portion, and return the flock-enriched portion to the reactor; and a filter subsystem, having an inlet port in fluid communication with the reactor, adapted to substantially remove flock formed from electrochemical combination with material from the anode subsystem, and having an outlet port.

The various parameters of the reactor and the operating process parameters can be selected based on the desired performance characteristics. For example, a 2 million gallon per day capacity can require 4 reactors with 500 AMP capacity each, while a smaller 50 thousand gallon per day facility can require a single 50 AMP capacity reactor.

In some operating environments, precipitates such as calcium can form on the electrodes and reduce performance. Agitation of the affected electrodes, e.g., by mechanical vibration, can discourage precipitate formation, dislodge precipitate, or both. Similar results can be achieved by changing fluid flow rates, patterns, or pressures; by agitation of individual electrodes, electrode groups, or the whole reactor vessel; or by changing other properties such as fluid temperature in appropriate patterns, or by manual or automated scraping. Such agitation can be performed continuously, or can be performed periodically on a schedule determined by time or another property such as fluid volume through the reaction or flock produced by the reaction. Also, such agitation can be performed in response to an indication that precipitation has occurred, such as measurements of electrode mass or weight (an increase can indicate precipitate formed on the electrode), fluid flow rate and pressure (precipitate can clog fluid flow paths), electrode thickness (an increase can indicate precipitate on the electrode), system performance measurements, or other direct or indirect measurements of precipitate formation.

Subsystems

In some configurations, the fluid and flock are transported from the reaction location to a holding tank or a flock building area. This can be continuous, or can be periodic after a time delay or sensed reaction conditions. Transporting the fluid allows control of the exposure of the fluid to the reaction. A low sheer or "gentle" pump can be used to transfer the fluid to reduce any breaking up of the flock. Such a pump can comprise an inertial pump, with an open or closed impellor. The impellor diameter can depend on the flow requirements. The impellor can be driven at 1100 to 1200 RPM in some embodiments. Generally, impellor rates of below about 1700 RPM can be suitable.

The electrical control system can be configured so that the reactor plates are initially energized with a low voltage. The power can be gradually increased until a desired power level or reactor operating characteristic is reached. The gradual increase in power can require about a minute, or less, from start until full power. A gradual start can foster longer service life of the electronics and power supply in some embodiments.

The electrodes can be energized with alternating polarity. Periodically, for example at set time intervals or when certain reactor operating conditions are reached, the polarity of the voltage supplied to the electrodes can be changed, exchanging the roles of the anodes and cathodes. Reversing the polarity will not adversely affect the flock generation or contaminant removal process (assuming that the anodes and cathodes are configured such that each can fill each role). Reversing the polarity can extend the reactor or electrode life in some embodiments by exposing all of the electrodes to anode consumption. Also, reversing the polarity can foster self-cleaning of the electrodes. Contaminants or plating can build up on a cathode at one polarity; when the polarity is reversed, the cathode becomes an anode and begins to lose electrode material to the reaction. Contamination or plating attached to such material is consequently removed as part of the anode operation of the electrode. Polarity reversals every 1 to 6 hours can be suitable for some embodiments.

The pH of the fluid in the reactor can be controlled by monitoring the pH of the incoming fluid or the fluid in the reactor. If a pH increase is sensed, then current can be increased to electrodes containing carbon. If a pH decrease is sensed, then current to electrodes containing carbon be decreased. Also, the temperature of fluid in the reactor can be controlled. For example, heating fluid entering the reactor can improve reaction rates, and can encourage thorough mixing of the fluid with the reacting elements.

The generation of flock within the reactor is important to the effectiveness of the system. Insufficient flock can lead to low contaminant removal performance; excessive flock generation can require excessive power generation and reduced electrode life. The properties of fluid exiting the reactor can be monitored to determine the characteristics of flock generation, and those characteristics used in the control system to determine voltage, current, duty cycles, electrode spacing, activation of specific electrodes, etc. For example, a conventional turbidity measurement of fluid exiting the reactor can provide an estimate of flock generation. Other measurements can also be representative of flock generations, such as fluid density, viscosity, acoustic properties. The level of flock generation desired can also be varied depending on the contamination level of the incoming fluid, on the desired contaminant removal properties, the available power, or a combination of those or other factors.

The electrical power supply to the electrodes can be monitored to derive information relative to maintenance of the system. The spacing between the electrodes contributes to a resistance presented to the power supply. As electrode material is consumed by the reaction, the spacing between the electrode surfaces can increase. The consequent increase in resistance can be sensed by monitoring the power supply. An excessive resistance, or power supply requirement, can indicate that the electrodes need replacing or the inter-electrode spacing needs maintenance.

Figure 3:
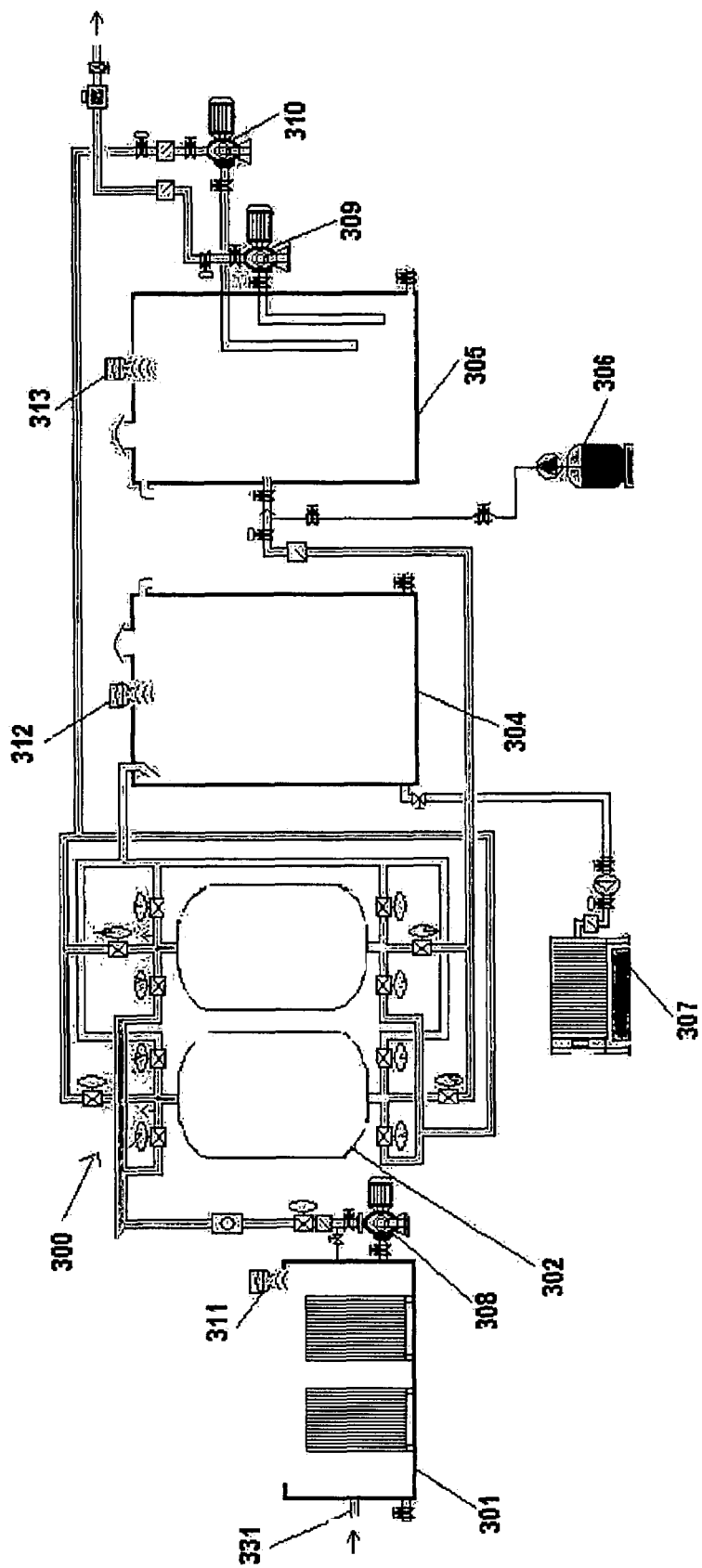
FIG. 3 is a schematic illustration of an apparatus according to the present invention.

Example System. FIG. 3 is a schematic illustration of an apparatus according to the present invention. The apparatus comprises a reactor 301 such as those discussed above, a filter subsystem 302, a flock fluid vessel 304, a pure fluid reservoir 305, a disinfection subsystem 306, and a filter press 307, in fluid communication with each other via a distribution system 300.

The electrode arrangement of the reactor 301 is shown schematically; any of the configurations described above can be used. A power supply and control system (not shown) energizes the electrodes, and can provide self-cleaning and maintenance signals as discussed above. Fluid to be decontaminated can be introduced to the reactor 301 via an inlet 331. A sensor 311 can mount with the reactor to sense reactor conditions (e.g., pressure, fluid level, flow rate, pH, conductivity, dissolved oxygen, or purity).

After a suitable time exposed to the reactor 301, fluid can be removed from the reactor 301 using a pump 308 such as a "gentle" pump described above. The pump 308 transfers fluid through the distribution system 300 to the filter subsystem 302. The filter subsystem 302 removes flock from the fluid, passing purified fluid from the filter subsystem 302 to the pure fluid reservoir 305. In the example embodiment shown, a disinfection system 306 such as, for example, chlorine or ultraviolet, can be used to further treat the purified fluid. Pure fluid can be removed from the pure fluid reservoir 305 using a pump 309 and passed to its eventual use. A sensor 313 can mount with the pure fluid reservoir 305 to sense conditions in the pure fluid reservoir (e.g., pressure, fluid level, flow rate, pH, conductivity, dissolved oxygen, or purity).

Periodically, the distribution system 300 can be configured so that pure fluid from the pure fluid reservoir 305 is pumped using a pump 310 through the distribution system 300 back into the filter subsystem 302. This reverse fluid flow forces accumulated flock away from the filter subsystem. The distribution system 300 can be further configured to route the flock-laden fluid to a flock fluid vessel 304. The flock fluid vessel 304 can have a sensor 312 to sense conditions in the flock fluid vessel (e.g., pressure, fluid level, flow rate, pH, conductivity, dissolved oxygen, or purity). After sufficient accumulation of flock-laden fluid in the flock fluid vessel 304, the contents thereof can be routed to a filter press 307 where the solids can be compressed for easier handling and disposal. Excess fluid from the filter press can be discarded, routed back to the filter subsystem 302, or routed back to the reactor 301.

The filter subsystem 302 can comprise a plurality of filters in some embodiments. The distribution system 300 can be configured to allow forward flow (from the reactor 301 through the filter subsystem 302) through one subset of the plurality of filters, while contemporaneously allowing reverse flow (from the filter subsystem 302 to the flock fluid vessel 304. In this way, "backwashing" of one of the plurality of filters can proceed while another filter is in normal operation, and so the reaction and filter process need not be halted to backwash a filter. In some embodiments, halting and restarting the purification process can lead to reduced performance.

Figure 4:
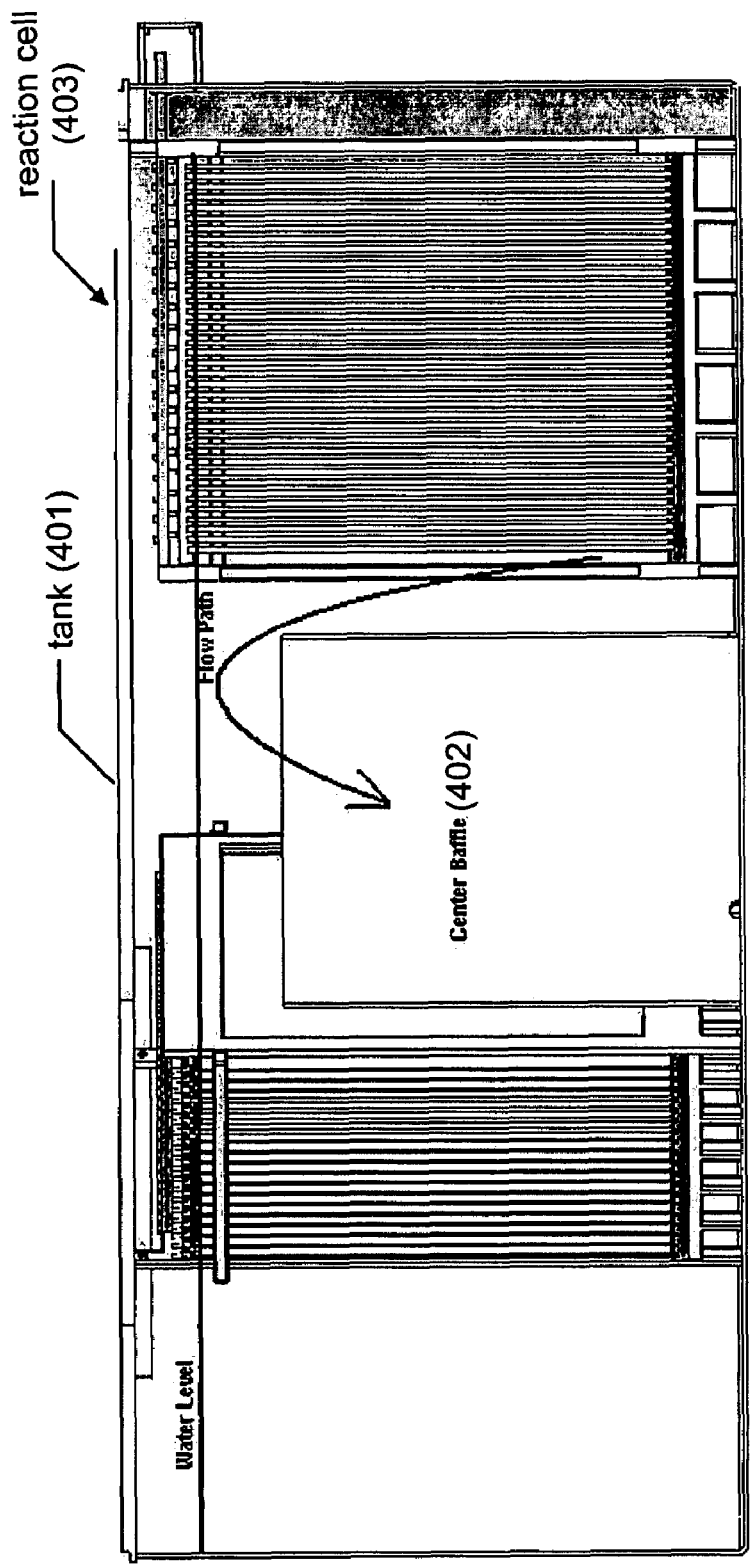
FIG. 4 is a schematic illustration of a reactor tank suitable for some applications of the present invention.

Example System. FIG. 4 is a schematic illustration of a reactor tank 401 suitable for some applications of the present invention. FIG. 4 shows a sectional view through the tank. The tank 401 can comprise any of a variety shapes; for example, it can comprise a substantially cylindrical shape. A flow directing element, such as the center baffle 402 shown in the figure, mounts within the tank 401. Electrodes can be placed within a reaction cell 403 in the tank 401 to contact and treat fluid introduced thereto. A fluid inlet allows fluid to enter the tank near the bottom of the tank. Fluid outlets near the top of the tank allow fluid to exit the tank. Alternatively, one or more fluid outlets can be configured near the top of the baffle. In operation, fluid entering the tank must travel across electrodes at least from the bottom of the tank to the top, and generally will travel around the baffle as it does. Consequently, the fluid will pass in proximity to a significant area of electrodes, encouraging more complete reaction and contaminant removal. The electrolytic coagulation/flocculation process generates floc as a result of secondary reactions with the surrounding water. The process can utilize the water as an electrolytic medium to initially liberate metal (e.g., aluminum or iron) ions from the anode plate; these particles then form various water complex structures. The adequate flow of water between the anode and cathode provide transportation for the flock from the anode plate reaction site. In addition the appropriate and adequate water flow between the anode and the cathode promote floc and contaminant mixing resulting in improved water decontamination capacity and performance.

Figure 5A:
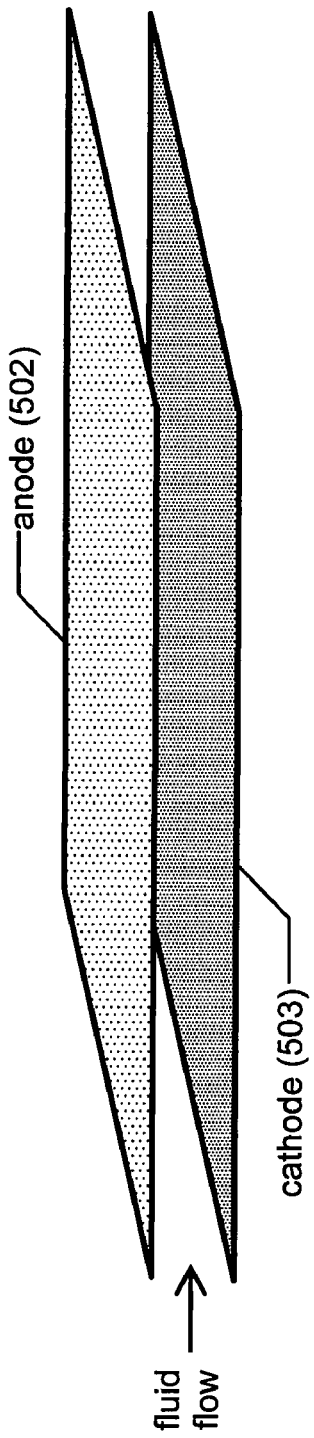
FIG. 5(a,b,c,d) are schematic illustrations of various flow path configurations that can be suitable for use as reactor vessels.
Figure 5B:
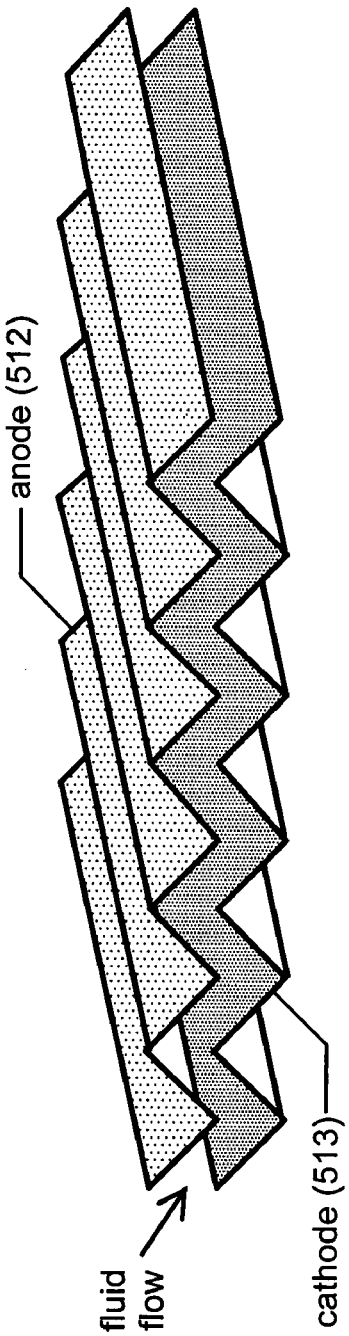
Figure 5C:
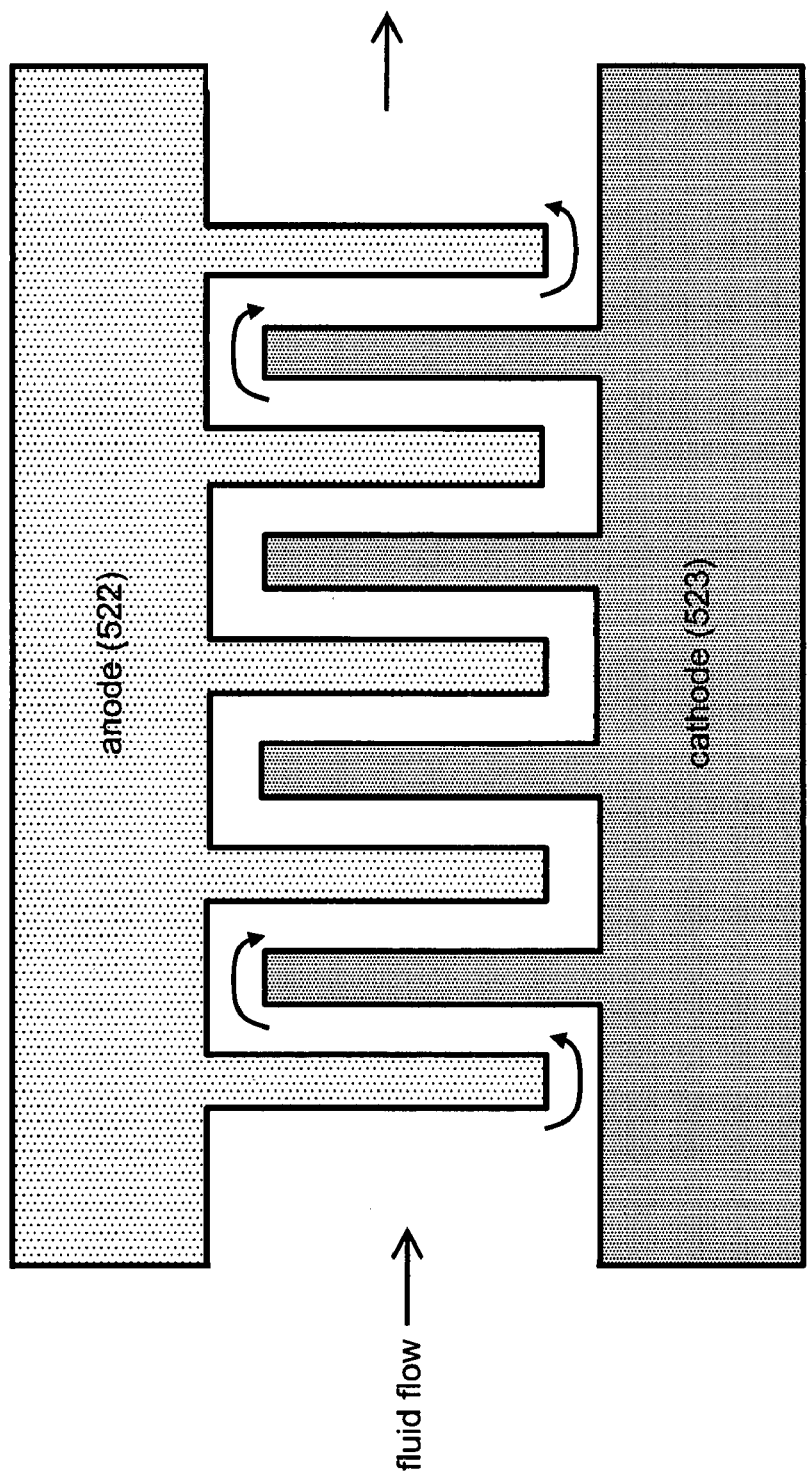
Figure 5D:
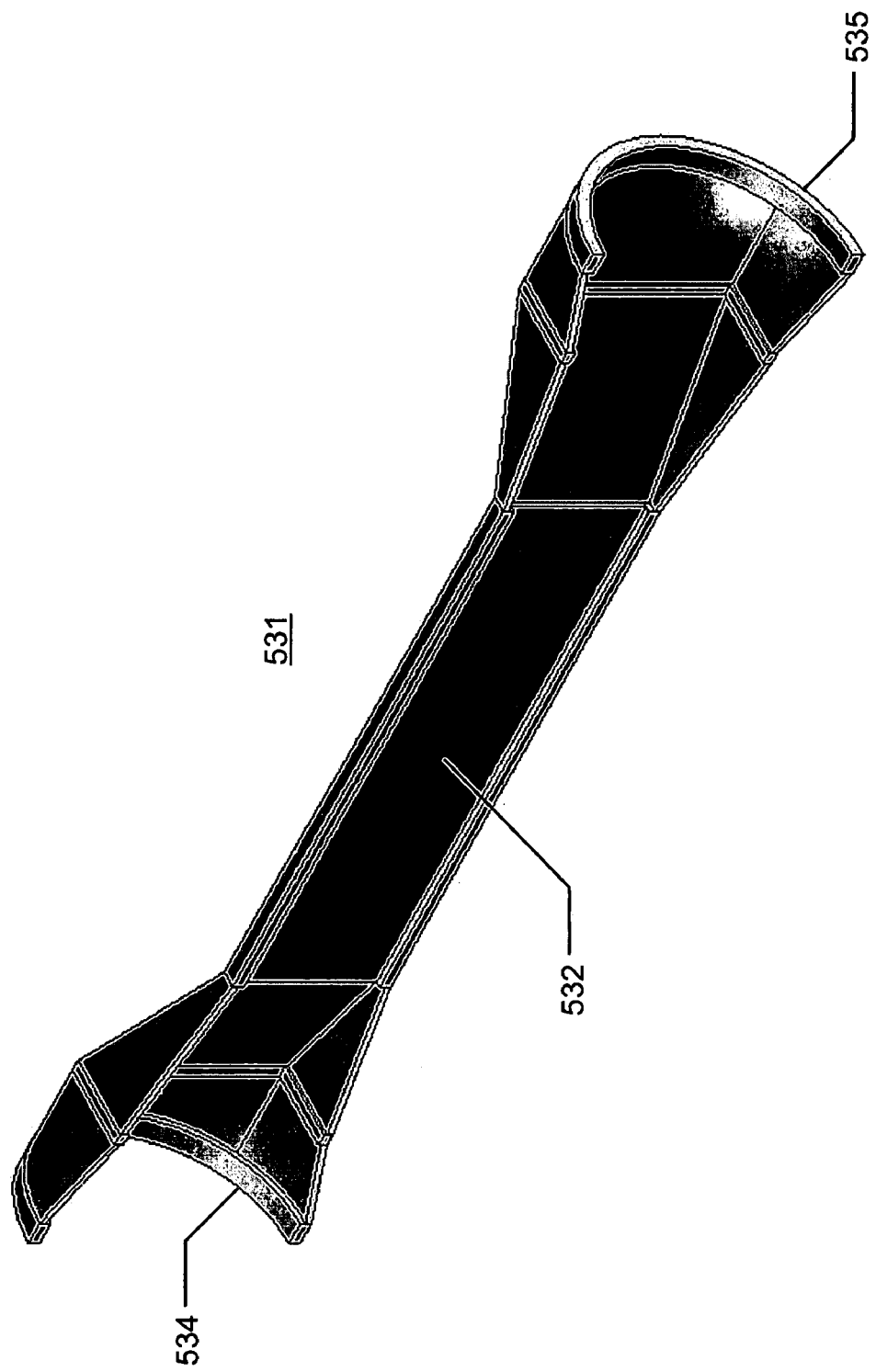

Example System. The reactor tank can be configured as part of a flow path. FIG. 5(a,b,c,d) comprise schematic illustrations of various flow path configurations that can be suitable for use as reactor vessels. In FIG. 5a, an anode 502 mounts with a cathode 503 such that they present substantially planar surfaces to each other. The separation between the planes can be determined from the desired electrode voltage and current and the characteristics of the specific electrode materials, the incoming fluid, and the desired performance. The fluid can be flowed between the two planes, passing a significant electrode area as it passes. One or both of the electrodes can be configured to have a nonplanar surface, which can encourage thorough mixing of the fluid with flock. FIG. 5b shows an example of this, where both electrodes 512 and 513 present a series of angular projections to each other, similar to teeth on a saw or ridges on a file. In FIG. 5c, an anode 522 and cathode 523 present complex surfaces to each other, forming a serpentine path through which fluid flows. FIG. 5d illustrates a section through a pipe shaped to provide a reactor tank 531. First and second ends 534 are 535 configured to mount with common cylindrical pipe. The circular end cross-sections are mated with two substantially planar portions (one 532 shown in the figure), which portions face each other and comprise electrodes of the tank.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

The invention claimed is:

1. A method for removing a contaminant from fluid, comprising:
    a) Providing an anode and a cathode;
    b) Placing the fluid in contact with the anode and the cathode;
    c) Providing an electrical voltage between the anode and the cathode, where the electrical voltage is such that current flows between the anode and cathode through the fluid and forms flock by electrochemical combination of material from the anode with the contaminant;
    d) Removing at least some of the flock from the fluid;
    e) Returning at least some of the flock to fluid in an electrical current flow path between the anode and the cathode.

2. A method as in claim 1, wherein the anode is made of iron, aluminum, carbon, or alloys thereof.

3. A method as in claim 1, wherein the cathode is made of iron, aluminum, carbon, or alloys thereof.

4. A method for removing a contaminant from fluid, comprising:
    a) Providing a pH-anode comprising carbon;
    b) Providing a cathode;
    c) Placing the fluid in contact with the pH-anode and the cathode;
    d) Providing an electrical voltage between the pH-anode and the cathode, where the electrical voltage is such that current flows between the anode and cathode through the fluid and reduces the pH of the fluid;
    e) Removing contaminants from the fluid according to the method of claim 1.

5. A method as in claim 1, wherein providing an electrical voltage comprises providing an electrical voltage at a first polarity for a first time, then providing an electrical voltage at a second polarity, opposite the first polarity, for a second time.

6. A method as in claim 5, wherein the first time ends when a determined increase in the electrical voltage required to maintain a minimum current through the fluid is detected.

7. A method as in claim 5, wherein the first time ends when an increase in the resistivity between the anode and the cathode is detected.

8. A method as in claim 1, further comprising sensing the electrical voltage and current, and providing a maintenance signal based on a combination of the voltage and current.

9. A method as in claim 1, wherein removing at least some of the flock from the fluid comprises passing flock-laden fluid through a filter.

10. A method for removing a contaminant from fluid, comprising:
    a) Providing an anode and a cathode;
    b) Placing the fluid in contact with the anode and the cathode;

c) Providing an electrical voltage between the anode and the cathode, where the electrical voltage is such that current flows between the anode and cathode through the fluid and forms flock by electrochemical combination of material from the anode with the contaminant, and where the electrical voltage magnitude is determined responsive to an indication of flock produced;

d) Removing at least some of the flock from the fluid.

11. An apparatus for the removal of a contaminant from fluid, comprising:
   a) A reactor, comprising:
      i) A reactor container suitable for containing a quantity of the fluid;
      ii) An anode subsystem mounted with the reactor container such that fluid in the reactor container will be in contact with at least a portion of the anode subsystem;
      iii) A cathode subsystem mounted with the reactor container such that fluid in the reactor container will be in contact with at least a portion of the cathode subsystem;
      iv) A power supply subsystem in electrical communication with the anode subsystem and the cathode subsystem, and adapted to supply an electrical potential between the anode subsystem and the cathode subsystem;
   b) A flock recycling and removal system, comprising:
      i) A flock separator, configured to separate fluid from the reactor into two portions: a flock-enriched portion and a flock-depleted portion, and return the flock-enriched portion to the reactor;
      ii) A filter subsystem, having an inlet port in fluid communication with the reactor, adapted to substantially remove flock formed from electrochemical combination of contaminant with material from the anode subsystem, and having an outlet port.

12. An apparatus as in claim 11, wherein the power supply subsystem comprises:
   a) An electrical detector, indicating current or voltage with respect to a threshold;
   b) A source of electrical energy at either of two opposing polarities;
   c) A control system, responsive to the electrical detector, causing selection of one of the two polarities of the source of electrical energy.

13. An apparatus as in claim 11, wherein the flock removal system comprises
   a) A source of backwash fluid;
   b) A distribution system, adapted to place the source of backwash fluid in fluid communication with the fluid outlet of the filter subsystem;
   c) A contaminant removal port, in fluid communication with the fluid inlet of the filter subsystem, adapted to allow fluid flow therethrough when the source of backwash fluid is flowing through the filter subsystem.

14. An apparatus as in claim 11, wherein the power supply subsystem is adapted to provide an electrical potential between a carbon electrode and the anode subsystem responsive to a determined pH of the fluid.

15. An apparatus as in claim 11, wherein the filter subsystem comprises first and second filters, and further comprising a distribution system adapted to place one or both of the first and second filters in fluid communication with a source of backwash fluid.

16. An apparatus as in claim 11, wherein the flock removal system is pressurized.

17. A method as in claim 1, further comprising agitating the anode, cathode, or both, in a manner that encourages precipitate formed on the anode, cathode, or both to dislodge therefrom.

18. An apparatus as in claim 11, further comprising a sensor responsive to flock formation in the reactor, and wherein the power supply subsystem provides an electrical potential responsive at least in part to the sensor.

19. An apparatus as in claim 11, further comprising an agitator coupled to the anode subsystem, the cathode subsystem, the reactor container, or a combination thereof, wherein the agitator acts to encourage precipitate to dislodge from at least one of the anode subsystem, the cathode subsystem, and the reactor container.

20. An apparatus as in claim 11, wherein the reactor container accepts fluid at one or more inlet ports near a first portion of the container, and outputs fluid at one or more outlet ports near a second portion of the container, wherein a fluid flow path from the first portion to the second portion passes over a large area of the anode subsystem, the cathode subsystem, or both.

21. An apparatus as in claim 11, wherein the anode subsystem comprises an anode surface, and wherein the cathode subsystem comprises a cathode surface, and wherein the anode subsystem mounts with the cathode subsystem such that the anode surface and cathode surface are spaced apart, forming the reactor container therebetween.

22. An apparatus as in claim 21, wherein the anode surface, the cathode surface, or both, are substantially planar.

23. An apparatus as in claim 21, wherein the anode surface, the cathode surface, or both, are corrugated, ribbed, grooved, or wavy.

24. An apparatus as in claim 21, wherein one of the anode surface and the cathode surface comprises a hollow cylinder, and wherein the other of the anode surface and the cathode surface comprises one or more elongated elements, and wherein the one or more elongated elements mount within the interior volume of the cylinder.

25. The method of claim 10, further comprising:
   a) Providing a pH-anode comprising carbon;
   b) Placing the fluid in contact with the pH-anode and the cathode; and
   c) Providing an electrical voltage between the pH-anode and the cathode, where the electrical voltage is such that current flows between the pH-anode and cathode through the fluid and reduces the pH of the fluid.

* * * * *